United States Patent [19]
Verstegen

[11] 3,950,497
[45] Apr. 13, 1976

[54] PROCESS FOR PREPARING ALKALI METAL AND ALKALINE-EARTH METAL CYANATES

[75] Inventor: Johannes D. M. Verstegen, Sittard, Netherlands

[73] Assignee: Stamicarbon B.V., Geleen, Netherlands

[22] Filed: June 19, 1974

[21] Appl. No.: 481,120

[30] Foreign Application Priority Data
June 28, 1973 Netherlands.................. 7309002

[52] U.S. Cl. ............................................. 423/365
[51] Int. Cl.² ........................................ C01C 3/14
[58] Field of Search............................ 423/364, 365

[56] References Cited
UNITED STATES PATENTS

| | | | |
|---|---|---|---|
| 1,915,425 | 6/1933 | Kleopfer............................ | 423/365 |
| 2,712,492 | 7/1955 | McKay et al. ..................... | 423/365 |
| 3,166,390 | 1/1965 | Roberts et al. .................... | 423/364 |

*Primary Examiner*—Earl C. Thomas
*Attorney, Agent, or Firm*—Cushman, Darby & Cushman

[57] ABSTRACT

Cyanates of alkali and alkaline-earth metals are prepared by reacting a salt such as the hydroxide, carbamate or carbonate of the metal in aqueous solution or slurry with cracked urea gas which is a gaseous mixture of ammonia and (iso)cyanic acid.

6 Claims, 1 Drawing Figure

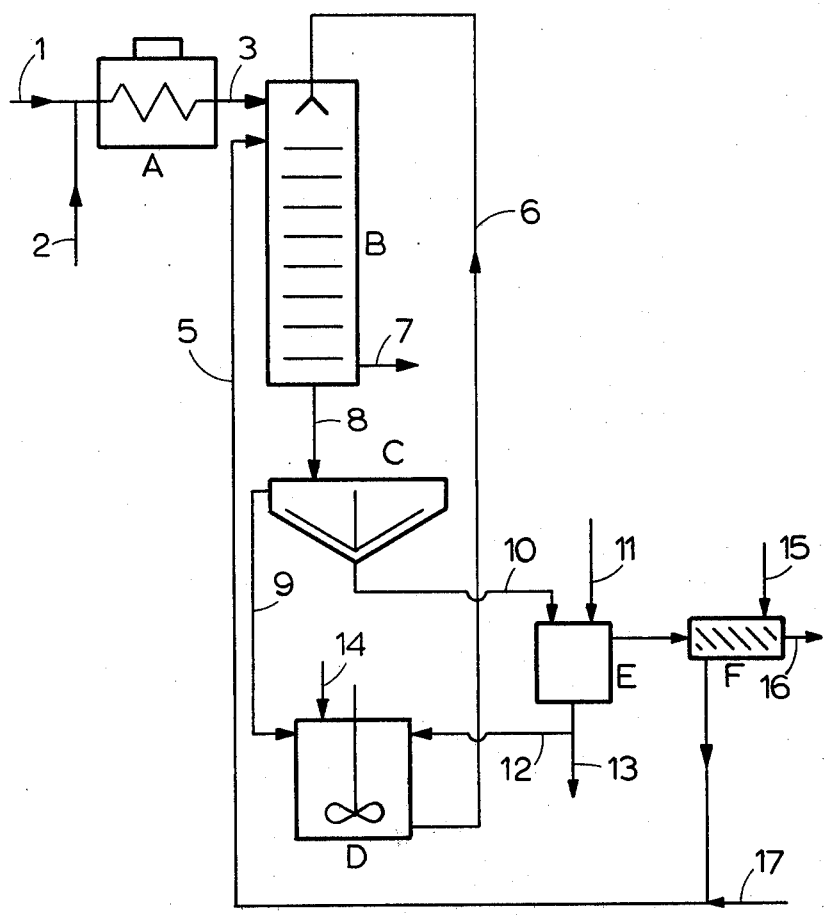

PROCESS FOR PREPARING ALKALI METAL AND ALKALINE-EARTH METAL CYANATES

BACKGROUND OF THE INVENTION

This application relates to the preparation of the cyanates of alkali metals and alkaline earth metals. It is well known to prepare alkali metal and alkaline-earth metal cyanates using various methods, however, none of these known methods is satisfactory in every respect as each has its inherent drawbacks.

For instance, it is possible according to British Patent Specification No. 339,220 to prepare salts of cyanic acid by heating urea above its melting point with oxides, hydroxides or carbonates of alkali metals or alkaline-earth metals in the absence of solvents. In this process, however, the yield obtained is low because water is liberated during the reaction, and the thus liberated water, under reaction conditions, partly hydrolyzes the cyanate formed. For instance, when a metal hydroxide is used as the starting material 1 mole of water is liberated for every equivalent of cyanate formed, which, in turn, accounts for the hydrolysis of 0.5 mole equivalent of cyanate, so that, in the net reaction, the overall cyanate yield does not reach much beyond 50 percent. Another disadvantage of this known process is that, in practice, handling the urea melt involves technological difficulties.

According to another process described in British Patent Specification No. 354,604 ammonium cyanate is converted with a metal-oxide or metal-hydroxide in the presence of aliphatic monoalcohols or liquid ammonia. Even at a relatively low temperature this reaction proceeds at a sufficient rate, the hydrolysis rate of the cyanate product formed being minimal at the low temperature. Therefore, the presence of a small amount of water, contrary to the urea process, is not disastrous in that case. However, this process does have the disadvantage in that ammonium cyanate must first be prepared and isolated and this preliminary procedure substantially adds to the cost price of the metal cyanate to be prepared. Moreover, the introduction of a substance which itself is not one of the reactants, like an aliphatic monoalcohol, renders operational control of the reaction more complex.

An object of the present invention is to provide a process for preparing salts of cyanic acid which avoids these drawbacks as well as other disadvantages, and which also offers other specific advantage over prior procedures.

DETAILED DESCRIPTION OF THE INVENTION

According to the present invention an aklali metal or alkaline-earth metal cyanate is prepared from urea and a suitable alkali metal compound or alkaline-earth metal compound reactant characterized in that in a suitable cracking zone the urea is cracked, under appropriate conditions, into a gaseous mixture of ammonia and (iso)cyanic acid and it is this mixture that is then reacted in an absorption zone with an aqueous solution or suspension of a "salt" of the alkali or alkaline-earth metal, such as a hydroxide, carbamate or carbonate of the alkali or alkaline-earth metal. The word "carbonate" also includes basic and acid carbonates.

Since it is not possible for pure ammonium cyanate to be prepared by introducing urea-cracking gas into water owing to the rapid isomerization of the freshly formed ammonium cyanate into urea which will then take place, I believe that it is highly surprising that pure alkali metal and alkaline-earth metal cyanates can be prepared at all by the process according to the present invention and described in more detail herein. According to this reaction scheme, practically no (iso)cyanic acid is lost through reaction and conversion into urea, as evidenced by the fact that yields of 95 percent and even higher of alkali metal or alkaline-earth metal cyanate product are obtained, calculated on the basis of (iso)cyanic acid supplied. The total yield on the basis of converted urea is also in the same order of magnitude. The relatively minor (iso)cyanic acid losses which occur are mainly attributed to hydrolysis of cyanate into carbonate.

The term "alkali metal" refers to lithium, sodium, potassium, rubidium and cesium, the elements of the first group (Group IA) of the periodic system, and the term "alkaline-earth metal" refers to magnesium, calcium, strontium and barium of the second group (Group IIA) of the periodic system.

The cracking of urea into a gaseous mixture of (iso)cyanic acid and ammonia in itself is a well-known technique as described, for instance, in the U.S. Pat. Nos. 2,712,491, 3,166,390, 3,300,492 and 3,377,349, the Canadian Pat. Nos. 634,482 and 677,725 and the French Pat. No. 2,002,995, the disclosure of which is incorporated by reference to the extent necessary to understand and appreciate the present invention. According to one method of operation solid urea, such as in the form of prills, is added to a fluid bed of, say sand. Suitable fluidization gases are nitrogen, air and ammonia to name a few. The reaction temperature is in the neighborhood of about 270° and 600° C. There are, of course, several other urea cracking techniques that may be used. The following is a description of a process which in my experience has been found to be particularly suited to the present invention.

According to a preferred process, a urea melt is supplied to a urea cracking-zone maintained at a temperature of about 300°–500° C. The advantage of this arrangement is that the urea, prior to being delivered to the cracking-zone, can be easily purified, such as with absorbing carbon.

The temperature in the absorption zone in which the urea-cracking gas is contacted with the alkali metal or alkaline-earth metal compound used as starting material lies, preferably, below about 90° C. I have found that at higher temperatures the hydrolysis of the alkali metal or alkaline-earth metal cyanate formed proceeds at a substantial rate, which results in product losses and to the occurrence of a contaminated product as well. Preferably, a reaction temperature of between about 20° and 50° C. is recommended. The reaction pressure is not a critical factor and, as such, may be conveniently taken at atmospheric pressure. In some cases, it may be desirable, however, to employ a higher or lower pressure which is preferably within the range of 1–10 atm.

Heat balance in the absorption zone is carefully controlled. In this scheme, by preference, the reaction heat developed in the absorption zone and the heat supplied to the absorption zone with the urea cracking-gas being removed out of this zone by evaporation of water. The evaporation temperature and, as a consequence, the reaction temperature are maintained fairly low by passing through the zone an inert gas, for instance air.

When the starting material is e.g. the carbamate, the carbonate or the acid carbonate of the alkali or alkaline-earth metal, carbon dioxide, together with ammonia, are discharged in the off-gases from the absorption zone. Separating a mixture of carbon dioxide and ammonia into its pure components is difficult, so that this manner of conducting the process according to the present invention is not particularly attractive.

In order to avoid the separation problem a preferred starting material is in the form of an alkali or alkaline-earth hydroxide, in which case the disadvantage is avoided.

The alkali metal or alkaline-earth metal cyanate thus formed leaves the reactor in the form of an aqueous solution or slurry, from which the salt is easily separated off. Evaporation, if required, is also carried out at a low temperature, preferably below 90° C. and more preferably below 50° C. in order to avoid hydrolysis of the alkali metal or alkaline-earth metal cyanate product.

According to a particularly suitable and thus preferred mode of realizing the process for preparing alkali metal cyanates according to the present invention, the alkali metal compound used as starting material is supplied to the reactor in the form of an aqueous solution which, at the prevailing temperature and pressure within the reactor, is virtually saturated with the alkali metal cyanate to be prepared, or at the least contains a quantity of alkali metal cyanate that corresponds with the saturation level after removal of the water which is evaporating in the absorption zone.

The slurry of alkali metal cyanate in a saturated aqueous alkali metal cyanate solution leaving the reactor is separated by centrifuging, decanting, filtering or other suitable means, into solid alkali metal cyanate, which is recovered as a crude product and is further purified and/or dried as needed, and also a saturated alkali metal cyanate solution. The starting alkali metal material is added to this saturated solution in the solid state or as a solution or suspension, whereupon the entire mixture of solution is returned to the reactor for further processing. The quantity of water introduced with the alkali metal compound used as starting material must be such that the total quantity of circulating water remains relatively constant. In this way, the entire step in which the alkali metal cyanate solution which would otherwise be concentrated by evaporation is avoided, while at the same time a practically quantitative recovery of the alkali metal cyanate formed is still possible.

In the preparation of alkaline-earth metal cyanates according to the present invention the solubilities of the alkali metal and alkaline-earth metal compound starting materials are taken into account so as to adjust the efficiency of the operation. For example, starting from urea and, say, calcium hydroxide, the calcium hydroxide is supplied in the form of a slurry rather than a solution, in order that a reasonable throughput be achieved. Surprisingly, the reaction product — in this case calcium cyanate — is free from unconverted calcium hydroxide. The only contaminant present is calcium carbonate, which is formed, although in only slight amounts, by hydrolysis of cyanate.

The present invention will be further described and characterized in the attached drawing and working example, both of which are illustrative of the process.

EXAMPLE 1

In the reaction diagram in which crack-furnace A is supplied via line 1 with 576 grams per hour of liquid urea at 133° C. At the same time, via line 2, nitrogen gas is supplied, which is introduced into A together with the liquid urea. The urea is cracked in A at 350° C. into its components (iso)cyanic acid and ammonia, which are led in the gaseous state via line 3 to the absorption zone B together with the nitrogen. Absorption zone B is further supplied with air via line 5 and, via line 6, with 3285 grams per hour of an 11.7 percent by weight sodium hydroxide solution saturated with sodium cyanate at 40° C. In absorber B, the gas streams and the liquid stream are contacted in co-current flow, and sodium cyanate is formed. An air stream, enriched with nitrogen and loaded with water vapor and ammonia, leaves reactor B via line 7. Ammonia can be recovered from this stream according to known procedures (not illustrated), for instance by washing with water. The volume of the amount of air supplied via 5 is controlled such that the temperature in B remains about 40° C.

An aqueous slurry containing approximately 20 percent by weight of solid sodium cyanate flows via 8 to centrifuge C, where the solid is separated from the liquid. The liquid flows through 9 to solution vessel D. Via 14, D is supplied with make up solid sodium hydroxide in a quantity such that an 11.7 percent by weight sodium hydroxide solution is obtained, which flows to B through line 6 and is recycled. The solid separated off in C is delivered to washing section E via 10, to be washed with wash water supplied via 11. Part of the wash water used flows, if necessary, via 12 to D, for replacement for the water which has been removed as a vapor from the circulating stream via 7. The remainder of the wash water is discarded via 13.

The pure sodium cyanate product is dried in a drying-trough F with drying-air supplied via 15 and is subsequently discharged through 16. The drying air in whole or in part is directed to B via 5 and is optionally replenished with air supplied through 17.

The pure sodium cyanate yield amounts to 595 grams per hour, which corresponds with a yield of 95 percent calculated on the basis of the urea input.

EXAMPLE 2

Calcium cyanate is prepared in a completely analogous manner and to this end B is supplied with a 10.8 percent by weight milk of lime, instead of with sodium hydroxide solution. The reaction product consists of calcium cyanate containing calcium carbonate as the only contaminant. The yield amounts to 80 percent again calculated on the basis of the urea input.

What is claimed is:

1. A process for the preparation of alkali metal cyanate or alkaline-earth metal cyanates in relatively high yield comprising first cracking urea forming a gaseous mixture of (iso)cyanic acid and ammonia, then supplying the freshly prepared urea cracking gas to an absorption zone and contacting it at a temperature of about 20° to about 90° C with a hydroxide, carbamate or carbonate of a metal of Group IA or Group IIA of the periodic system in an aqueous solution or suspension thereof and maintaining the reaction within the stated temperature range and separating the resulting cyanate product from the reaction mixture.

2. A process according to claim 1 wherein the temperature in the absorption zone is about 20° to about 50° C.

3. A process according to claim 1 wherein an inert gas is also passed through the absorption zone.

4. A process according to claim 1 wherein the alkali metal or alkaline-earth metal compound is used in the form of a hydroxide.

5. A process according to claim 1 wherein the aqueous solution or suspension supplied to the absorption zone contains at least an amount of alkali metal or alkaline-earth metal cyanate compound corresponding with the saturation range after removal of the water evaporated in the absorption zone, and the slurry from the absorption zone is separated into solid and liquid, wherein the liquid mixed with the alkali metal or alkaline-earth metal compound starting material and that the resulting mixture is recycled to the absorption zone, the total quantity of circulating water being kept nearly constant.

6. A process for preparing an alkali metal cyanate or an alkaline earth metal cyanate in relatively high yield comprising supplying an aqueous solution or suspension of a hydroxide, carbamate or carbonate of one of said metals to an absorption zone, reacting together in said absorption zone the alkali metal or alkaline earth metal hydroxide, carbamate or carbonate with a gaseous mixture of ammonia and (iso)cyanic acid which has been previously prepared by cracking urea, separating the thus produced cyanate from the reaction medium and recycling at least a portion of the reaction medium to said absorption zone.

* * * * *